United States Patent [19]

Joensuu et al.

[11] Patent Number: 5,966,653
[45] Date of Patent: Oct. 12, 1999

[54] VALIDATING A FORWARD-TO-NUMBER WITHIN A MOBILE TELECOMMUNICATIONS SYSTEM

[75] Inventors: Erkki Joensuu, Siuntio, Finland; Eric Valentine, Plano, Tex.; David Boltz, Garland, Tex.; Ranjit Bhatia, Dallas, Tex.; James L. Mills, Plano, Tex.

[73] Assignee: Ericsson Inc., Research Triangle Park, N.C.

[21] Appl. No.: 08/637,939

[22] Filed: Jun. 24, 1996

[51] Int. Cl.$^6$ ........................................ H04Q 7/20
[52] U.S. Cl. ............................ 455/414; 455/417; 455/466; 379/211
[58] Field of Search ..................... 379/201, 379, 379/45, 216, 212, 230, 211; 370/428; 455/465, 461, 403, 417, 422, 445, 414, 411, 435

[56] References Cited

U.S. PATENT DOCUMENTS

| | | | |
|---|---|---|---|
| 3,854,013 | 12/1974 | Altenburger et al. | 179/18 |
| 4,768,221 | 8/1988 | Green et al. | 379/67 |
| 4,807,279 | 2/1989 | McClure et al. | 379/211 |
| 4,833,701 | 5/1989 | Comroe et al. | 379/60 |
| 4,893,336 | 1/1990 | Wuthnow | 379/211 |
| 4,901,340 | 2/1990 | Parker et al. | 455/411 |
| 5,142,654 | 8/1992 | Sonberg et al. | 379/59 |
| 5,289,528 | 2/1994 | Ueno et al. | 379/67 |
| 5,329,578 | 7/1994 | Brennan et al. | 379/67 |
| 5,335,278 | 8/1994 | Matchett et al. | 380/23 |
| 5,408,528 | 4/1995 | Carlson et al. | 379/211 |
| 5,440,614 | 8/1995 | Sonberg et al. | 379/60 |
| 5,448,627 | 9/1995 | Ueno et al. | 379/67 |
| 5,448,631 | 9/1995 | Cain | 379/201 |
| 5,473,671 | 12/1995 | Partridge, III | 379/59 |
| 5,577,103 | 11/1996 | Foti | 455/435 |
| 5,610,970 | 3/1997 | Fuller et al. | 379/201 |
| 5,689,547 | 11/1997 | Molnr | 370/379 |
| 5,701,301 | 12/1997 | Welsser, Jr. | 370/428 |
| 5,712,900 | 1/1998 | Maupin et al. | 397/45 |
| 5,839,065 | 11/1998 | Joesuu et al. | 455/414 |

FOREIGN PATENT DOCUMENTS

| | | |
|---|---|---|
| 0 255 325 A2 | 2/1988 | European Pat. Off. |
| 3843870 A1 | 6/1990 | Germany |
| 06141081 | 5/1994 | Japan |

*Primary Examiner*—Edward F. Urban
*Assistant Examiner*—Tilahun Gesesse
*Attorney, Agent, or Firm*—Jenkens & Gilchrist

[57] ABSTRACT

A request for call forwarding activation along with forward-to-number is received from a mobile station via one of the data channels such as a Stand-alone Dedicated Control Channel (SDCCH). The activation request itself is transported by an Unstructured Supplementary Service Data (USSD) message. The serving mobile switching center (MSC) analyzes the forward-to-number and establishes a speech connection with the mobile station by calling back the mobile station. Next, the MSC originates an outgoing call towards the forward-to-number and, as a result, establishes a speech connection between the mobile station and the telephone terminal associated with the forward-to-number. By establishing a speech connection between the two parties, the mobile subscriber requesting the call forwarding activation can verbally verify the forward-to-number. As an alternative, TCAP messages can be communicated between the serving MSC and the local exchange serving the forward-to-number to request the local exchange to verify the validity of the forward-to-number.

26 Claims, 6 Drawing Sheets

VALIDATING A FORWARD-TO-NUMBER WITHIN A MOBILE TELECOMMUNICATIONS SYSTEM

CROSS REFERENCE TO RELATED APPLICATION

This application is related to U.S. application for patent Ser. No. 08/636,288, filed Apr. 23, 1996, now U.S. Pat. No. 5,839,065 entitled "Validation Of A Forward-To-Number By A Mobile Station".

BACKGROUND OF THE INVENTION

1. Technical Field of the Invention

The present invention relates to mobile telecommunications systems and, in particular, to the validation of a forward-to-number for call forwarding subscriber features in a mobile telecommunications network.

2. Description of Related Art

In a typical mobile or wireline telecommunications system, a subscriber activates his call forwarding features by first establishing a speech connection with the telecommunications network serving the subscriber and then by manually inputting a desired forward-to-number. For example, the subscriber dials service code *76 for the Call Forwarding Don't Answer (CFDA) feature followed by a specific forward-to-number to activate the CFDA feature. Even though the subscriber might already know the validity of the forward-to-number, it is prudent to physically establish a speech connection with the entered forward-to-number to confirm that all future calls will indeed be forwarded to the correct number and that desired parties will be available to answer the forwarded calls. Accordingly, after receiving the entered forward-to-number, the telecommunications network initiates an outgoing call toward the forward-to-number to physically establish a speech connection between the subscriber and the telephone terminal associated with that particular forward-to-number (this action will hereinafter be referred to as the validation call). By means of the validation call, the system ensures that the forward-to-number is a valid and correct directory number within the telecommunications network. If the subscriber has inadvertently dialed a wrong number, or an unwanted user has answered the validation call, the subscriber is alerted and can abort the activation process. If the mobile subscriber confirms the validation call, all unanswered incoming calls to the mobile station are subsequently forwarded to the forward-to-number.

In the Global System for Mobile (GSM) or Personal Communications System (PCS) environment, a speech connection with the serving mobile switching center (MSC) is not utilized to activate or deactivate special subscriber features. With the development of data channels or control channels separate from the voice channel, mobile stations can communicate data with a Public Land Mobile Network (PLMN) without utilizing a speech connection. As an illustration, within the PCS environment, a mobile station displays a menu enumerating the available options to a mobile subscriber. The mobile subscriber selects the desired feature option, such as the activation of the CFDA feature, and enters the subsequently needed forward-to-number. A Direct Transfer Application Protocol (DTAP) based message, such as a Radio Interface Layer 3—Call Control (RILC3-CC) message, encapsulating the activation request along with the forward-to-number is transported to the serving PLMN over a connection-less communications link such as a Fast Associated Control Channel (FACCH) or Stand-alone Dedicated Control Channel (SDCCH). The serving Mobile Switching Center (MSC) receives the DTAP based message, extracts the encapsulated activation request and the forward-to-number, and alters the state of the CFDA feature to reroute all future incoming calls intended for that particular mobile station to the designated forward-to-number.

However, because there is no speech connection between a mobile station and the serving MSC, and the data channel is incapable of transporting voice data, the mobile telecommunications network is unable to provide verbal verification between the mobile station requesting the activation of a call forwarding feature and the telephone terminal associated with the specified forward-to-number. There is accordingly a need for a method and apparatus to validate an activated forward-to-number associated with a call forwarding feature within the PCS or GSM environment.

SUMMARY OF THE INVENTION

The present invention provides a method and apparatus for validating a forward-to-number received from a mobile station in connection with the activation of a call forwarding feature within the Personal Communications System (PCS) or Global System for Mobile (GSM) network. The mobile station transmits a request to activate a call forwarding feature toward a particular forward-to-number using a connection-less communications link. The serving mobile switching center (MSC) receives the request and then validates the received forward-to-number.

In one embodiment, the validation is performed by the mobile telecommunications network by placing a call back to the mobile station requesting the call forwarding activation and establishing a speech connection there between. The mobile telecommunications network then originates an outgoing call toward the forward-to-number. A speech connection is then established between the mobile station and the forward-to-number to verbally verify the number.

In another embodiment, the MSC transmits a connection-less application layer signal, such as a Transaction Capability Application Part (TCAP) message, requesting verification to the local exchange serving the forward-to-number. The local exchange verifies the validity of the forward-to-number and returns a TCAP message to the mobile switching center indicative of the result of the verification.

In one aspect, the present invention provides a method and system for establishing a speech connection between a mobile station requesting an activation of a call forwarding feature and a local exchange serving the specified forward-to-number.

In another aspect, the present invention provides a method and system for transmitting a connection-less application layer signal to the local exchange serving the forward-to-number to request verification of the number.

In still another aspect, the connection-less communications link comprises Direct Transfer Application Protocol (DTAP) based messages.

In yet another aspect, the connection-less communications link comprises Unstructured Supplementary Service Data (USSD) messages.

In yet another aspect, the connection-less communications link comprises Short Message Service (SMS) messages.

BRIEF DESCRIPTION OF THE DRAWINGS

A more complete understanding of the method and apparatus of the present invention may be had by reference to the following detailed description when taken in conjunction with the accompanying drawings wherein.

DETAILED DESCRIPTION OF THE DRAWINGS

Figure 1:
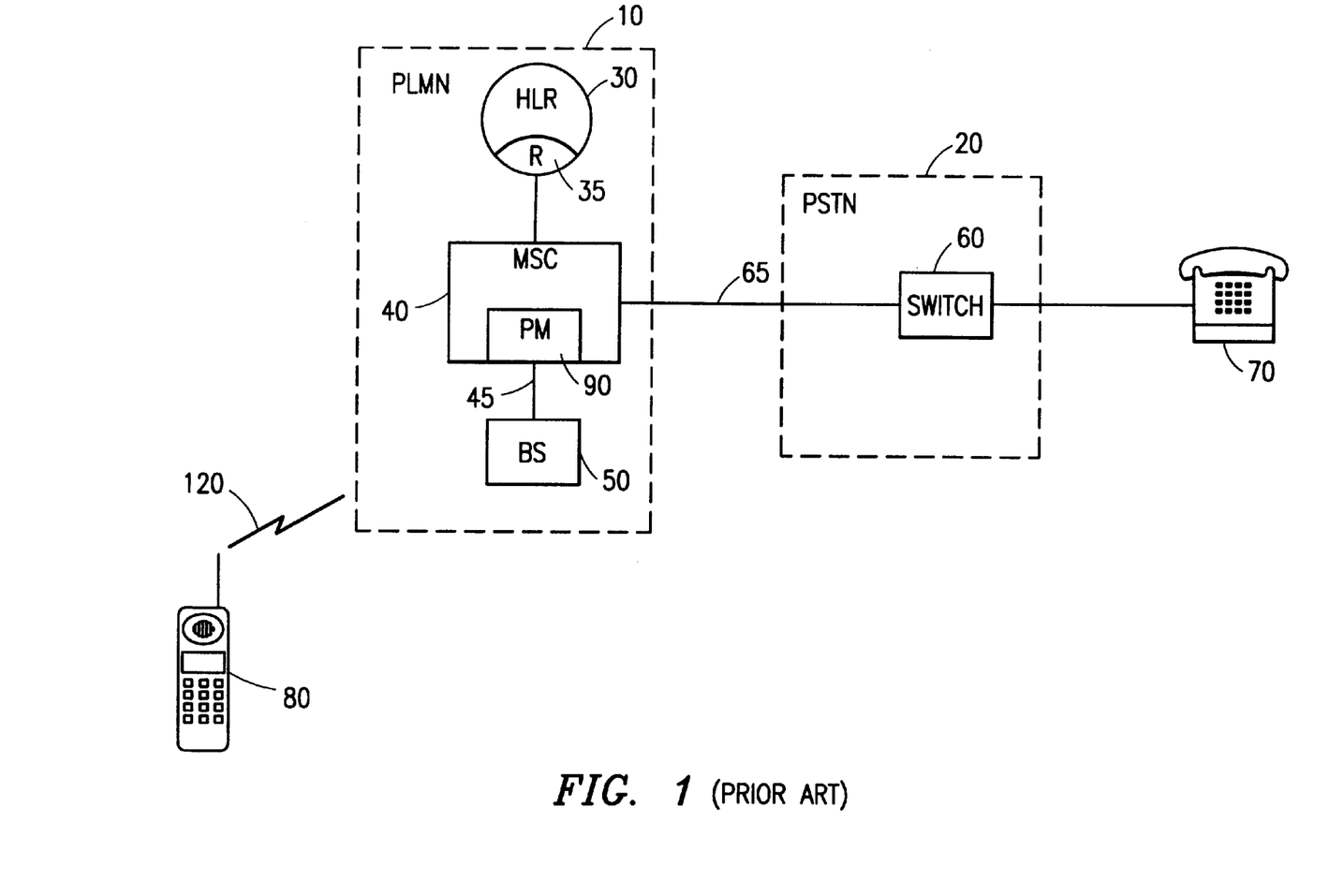
FIG. 1 is a block diagram of a Public Land Mobile Network (PLMN) illustrating the activation of a call forwarding feature in accordance with the prior art.

FIG. 1 is a block diagram of a conventional Public Land Mobile Network (PLMN) such as an analog cellular telecommunications system. The PLMN 10, which is used to communicate with a mobile station 80, comprises a Mobile Switching Center (MSC) 40, a home location register (HLR) 30, a visiting location register (VLR, not shown in FIG. 1), and a base station (BS) 50. The BS 50 is connected to the MSC 40 using a digital communications link 45, and communicates with a mobile station 80 via a radio channel 120. The mobile station 80 further communicates with other subscribers, such as a wireline terminal 70, via a Public Switched Telephone Network (PSTN) 20. The HLR 30 is a data base containing information about all "home" subscribers, their services and location. For example, the HLR 30 contains subscriber category information reflecting whether a particular mobile subscriber has a subscription to a particular call forwarding feature, and if the subscriber has the feature activated, the identity of the forward-to-number.

A call from the mobile subscriber starts when the mobile subscriber first keys in the desired destination number or service code and then presses the send button. An access channel is seized, whereupon the mobile identity and the entered number are automatically transmitted to the MSC 40 via the BS 50. The MSC 40 retrieves the subscriber category information for the calling subscriber from the HLR 30 and verifies that the caller has access to the system. The keyed number is also analyzed to determine if the caller is allowed to call that particular number or to invoke that particular subscriber feature associated with the entered service code. If all analyses are affirmative, the mobile subscriber is assigned to an analog or digital voice channel 120 and the call is set up.

The following steps are taken in accordance with the prior art when the mobile station 80 activates a Call Forwarding Variable (CFV) toward a wire-line terminal 70. A mobile subscriber turns on the mobile station 80 and enters the appropriate CFV service code and the forward-to-number representing the telephone terminal 70. After determining that the mobile station 80 has access to the network, the MSC 40 determines whether the mobile station 80 has a subscription to the CFV subscriber feature by requesting subscriber information from the HLR 30. Upon determining that the mobile station 80 has a subscription to the subscriber feature, the CFV program module (PM) 90 is seized. The CFV program module 90 initiates a speech connection 65 with the wireline terminal 70 by originating an outgoing validation call toward the local exchange 60 serving the wireline terminal 70. After the call set up has been successful, the mobile station 80 hears the ring tone and waits for the wireline terminal 70 to go off-hook. After the wireline terminal 70 goes off-hook and answers the CFV validation call, a speech connection between the mobile station 80 and the wireline terminal 70 is established. A mobile subscriber associated with the mobile station 80 may then verify or confirm with the subscriber associated with the wireline terminal 70 that he is about to forward all future calls to that particular number. After the validation call is disconnected, the CFV program module 90 alters the state of the CFV subscriber feature for the mobile station 80 by modifying the CFV subscriber information within the HLR 30. Thus, a register (R) 35 within the HLR 30 represents the mobile station's CFV status as active. The register 35 further stores the forward-to-number entered by the mobile subscriber. Subsequently, whenever an incoming call for the mobile terminal 80 is received, the CFV program module 90 retrieves the stored forward-to-number from the register 35 and reroutes the call to the wireline terminal 70. On the other hand, if the mobile subscriber has misdialed or an unwanted party has answered the validation call, the mobile subscriber is alerted and can abort the call forwarding activation process.

With the introduction of the Global System for Mobile (GSM) or Personal Communications System (PCS), call forwarding subscriber feature activations are no longer performed over a traffic channel. Instead, a mobile subscriber can activate a subscriber feature through communications over separate data channels, such as a Fast Associated Control Channel (FACCH) using Direct Transfer Application Protocol (DTAP) based messages, without physically establishing a speech connection between a mobile station and the serving MSC. In other words, there is no speech "leg" between the mobile station 80 and the MSC while requesting an activation of a call forwarding feature. Absent use of a traffic channel, it is not possible to provide verbal validation of a forward-to-number. It is recognized, however, that in most instances, it is prudent to validate the forward-to-number.

Figure 2:
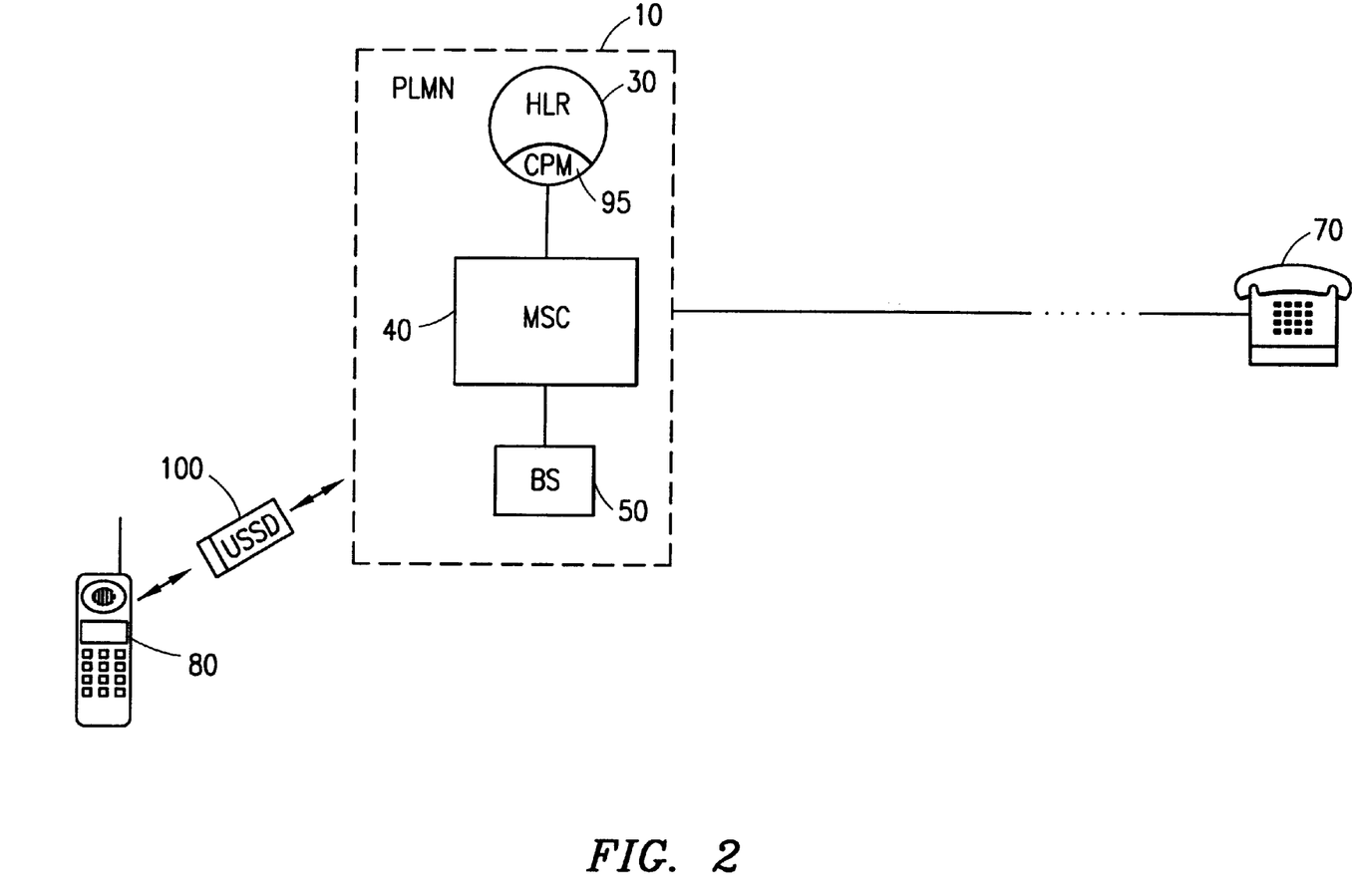
FIG. 2 is a block diagram of a PLMN illustrating the communication of an Unstructured Supplementary Service Data (USSD) message to activate a call forwarding feature.

Reference is now made to FIG. 2. With the introduction of the PCS, a number of different connection-less communications protocols have been introduced to transport unstructured user defined data between a mobile station and a serving MSC. Such protocols can be further utilized to transport user entered forward-to-number from the mobile station to the serving MSC for the purposes of activating a call forwarding feature. One such protocol is an Unstructured Supplementary Service Data (USSD) messages. Another is a Short Message System (SMS) message.

By utilizing a USSD message 100, the mobile station 80 is able to request an activation of a subscriber feature without establishing a speech connection with the serving MSC 40 in accordance with the teachings of the present invention. After receiving the USSD message 100 transmitted by the mobile station 80, the BS 50 forwards the message transparently to the MSC 40. A USSD handler (not shown in FIG. 2) within the MSC 40 retrieves the USSD message 100, and extracts the encapsulated data for forwarding to the appropriate application module. For example, if the USSD message 100 encapsulated a request to activate CFV, the USSD handler forwards the extracted request to the CFV activation program module (CPM) 95 within the HLR 30. The CPM 95 retrieves the relevant subscriber information and confirms that the requesting mobile subscriber has a subscription to the CFV feature. The CPM 95 then alters the subscriber information within the HLR 30 to reflect the activation status of the CFV subscriber feature.

Figure 3:
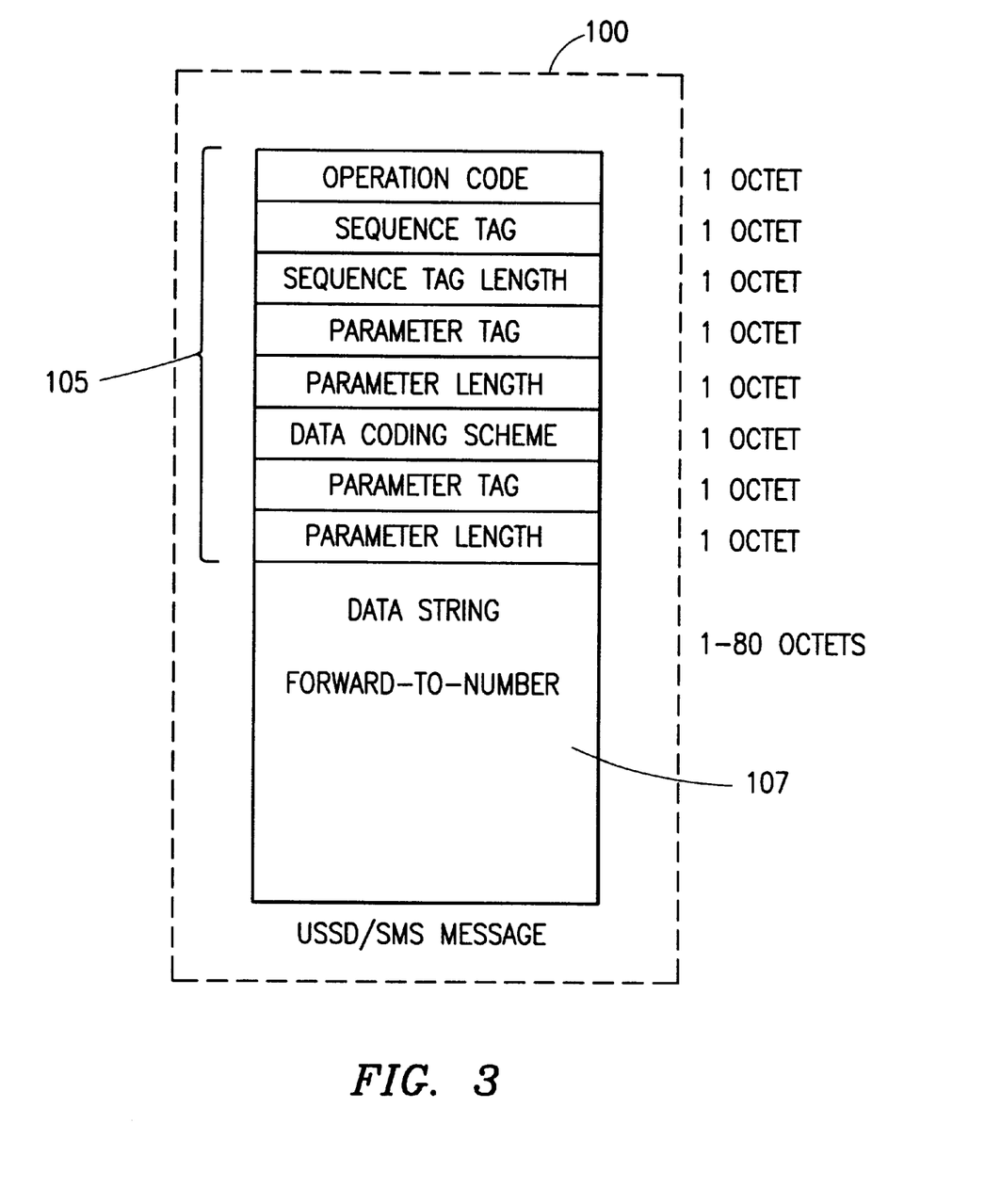
FIG. 3 illustrates the data format of an Unstructured Supplementary Service Data (USSD) or Short Message Service (SMS) message.

Reference is now made to FIG. 3 where a block diagram illustrating the data format for a USSD or Short Message System (SMS) message 100 is shown. SMS messages have the same structure or data format as USSD messages, encapsulate character based data, and communicate over a data channel such as an SDCCH. Even though SMS messages are normally used by different types of application services, for purposes of the present invention, both USSD and SMS messages can be utilized. As illustrated, the first eight octets 105 are used to specify which operation, application, language, parameter, data length, and data sequences are being used. The remaining eighty octets 107, if needed, are used to transport alphanumeric character data. Therefore, the first eight octets comprise the header section indicating which application module needs to receive the transported data, and how much and what type of data are being transported. The remaining eighty octets 107 comprise the data string section and stores the actual data indicated by the header section. Accordingly, a request to activate a call forwarding feature is encapsulated into the data string section 107 and transported from the mobile station 80 to the serving PLMN 10. The header section 105 specifies that the CPM 95 is the intended receiver for this particular message. The MSC 40 as shown in FIG. 2 then extracts the encapsulated request message and forwards it to the call forwarding program module 90 for activation.

For exemplary purposes, USSD messages are used to describe the transportation of a user entered forward-to-number over a connection-less communications link from a mobile station to a MSC. However, as the system and method of the present invention are applicable to any type of connection-less communications link, such as SMS, USSD, or DTAP, it will be understood that the description of the present invention in the context of USSD messages herein is by way of explanation of the invention rather than of limitation of the scope of the invention.

Figure 4:
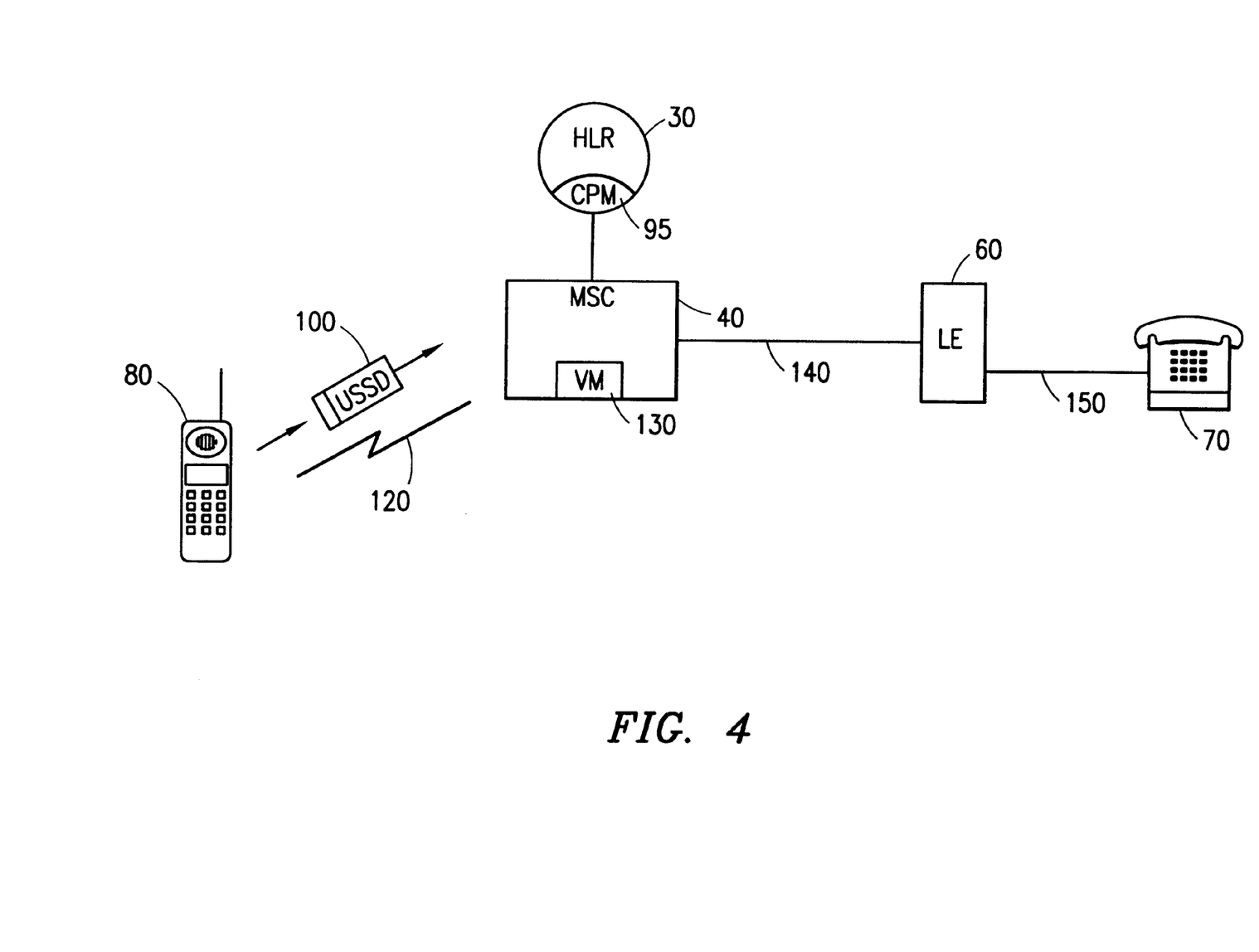
FIG. 4 is a block diagram of a PLMN illustrating a mobile switching center (MSC) establishing a validation call between a mobile station and a forward-to-number to verify the forward-to-number.

FIG. 4 is a block diagram illustrating a MSC 40 establishing a validation call connection between a mobile station 80 and a forward-to-number. The MSC 40 receives a request to activate a call forwarding subscriber feature from the mobile station 80 via a USSD message 100. The MSC 40 extracts the activation requests from the received USSD message for forwarding to the validation module (VM) 130. The validation module 130 determines whether the confirmation call should be performed for this particular mobile subscriber. In response to an affirmative determination, the validation module 130 initiates a call setup towards the mobile station 80 as illustrated by the radio channel 120. The mobile station 80 is alerted (rung) and subsequently answers the phone. A speech leg between the mobile station 80 and the serving MSC 40 has now been established. The validation module 130 then initiates another outgoing call setup towards the forward-to-number. The call setup request with the forward-to-number is sent over the trunk 140 to the local exchange (LE) 60 serving the wireline terminal 70 associated with the forward-to-number. Upon receipt of the call setup request, the local exchange 60 establishes a speech connection 150 and alerts the wireline terminal 70. As a result, upon answering the phone, the wireline terminal 70 is in speech connection with the mobile station 80. Verbal verification is now enabled between the two parties and the requesting mobile subscriber can be assured that the forwarding will be performed correctly to the correct party. Upon termination of the call, the validation module 130 passes control over to the CFV activation program module (CPM) 95 who in turn alters the subscriber information stored within the HLR 30 to reflect the successful activation of the feature. After the successful activation, all incoming calls intended for the mobile station 80 are forwarded to the wireline terminal 70 by the CFV program module 90.

The validation module 130 may be separately maintained as shown in FIG. 4, or can be incorporated into the CFV program module 90 (See FIG. 1). However, because there are a number of different call forwarding subscriber features, including Call Forwarding Don't Answer (CFDA), Call Forwarding Variable (CFV), and Call Forwarding Busy (CFB), that need to establish a validation call in accordance with the teachings of the present invention, it is efficient and modular to separate out the above functionality into a separate module and to allow access from multiple call forwarding program modules.

There is no way for the MSC 40, which is located remotely from the wireline terminal 70, to determine whether the USSD message 100 specified forward-to-number is a valid number. The MSC 40 can evaluate certain parts of the specified forward-to-number by checking the digit length (7 digits for local calls, 10 digits for long distance), and the Numbering Plan Area (NPA, more commonly known as area codes). However, these evaluations are limited to the syntax of the entered forward-to-number. Therefore, some form of communications with the local exchange 60 is required to verify the validity of the specified forward-to-number. One way, as described above, is to establish a speech leg with the requesting mobile station and to further initiate an outgoing call toward the forward-to-number. Another way is to communicate connection-less signals, like Transaction Capabilities Application Part (TCAP) messages, with the local exchange serving the forward-to-number to remotely verify the validity of the number. The transmitted TCAP message specifically requests the local exchange 60 to analyze the enclosed number to determine whether that number is a valid number within that local area.

TCAP messages are application layer messages within the Signaling System No. 7 (SS7) telecommunications network and are utilized by application layer modules to communicate information between any two nodes within the SS7 telecommunications network. SS7 itself has been deployed throughout the Bell Operating Companies (BOC) network, and has also been deployed by almost all independent long distance carriers and service providers. As a result, SS7 is the most dominant and prevalent telecommunications protocol in the United States. Therefore, without the need to establish a circuit between the two switches, a first switch is able to communicate, access, and execute functions within a second switch.

Figure 5:
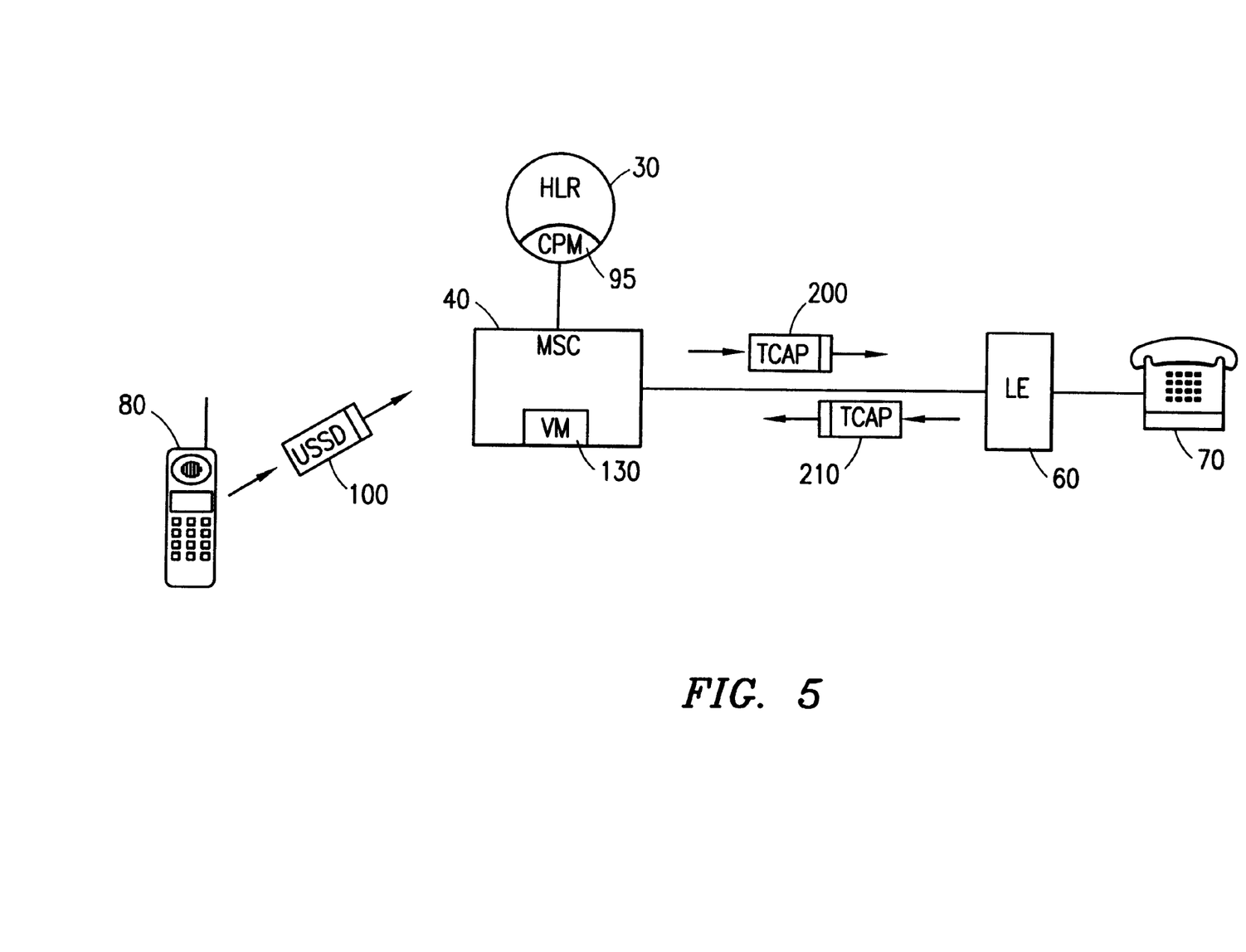
FIG. 5 is a block diagram of a PLMN illustrating a MSC communicating Transaction Capability Application Part (TCAP) messages to validate a forward-to-number.

FIG. 5 is a block diagram illustrating another embodiment of the present invention for validating the USSD message 100 specified forward-to-number. Instead of calling back the mobile station 80 and initiating an outgoing call setup toward the forward-to-number, a TCAP application layer signal is transmitted from the MSC 40 serving the mobile station 80 towards the local exchange 60 serving the wireline terminal 70.

Validation using a TCAP message may be better understood through examination of a specific example. The mobile station 80 requests an activation of a call forwarding feature via an USSD message 100. The serving MSC 40 receives the transmitted USSD message, extracts the request along with the entered forward-to-number, and passes them to the validation module (VM) 130. The validation module 130 transmits a TCAP message 200 towards the local exchange 60 serving the specified forward-to-number. The SS7 network, by performing number analysis on the NPA value as well as the first three prefixes of the local seven digit number, determines which particular local exchange is serving the forward-to-number and accordingly routes the TCAP message. The local exchange 60 receives the TCAP message and performs a number analysis to determine whether the enclosed forward-to-number is a valid subscriber number within its local network. After the determination, a result code is returned to the requesting MSC 40 via a TCAP message 210. In response to an affirmative result code, the validation module 130 invokes the CFV activation program module (CPM) 95. The CFV activation program module 95 again alters the subscriber information within the HLR 30 to reflect the successful activation of the forwarding feature for the mobile station 80. Another USSD message is returned to the mobile station 80 with a result code to inform the mobile subscriber that the activation request has been successfully performed.

Figure 6:
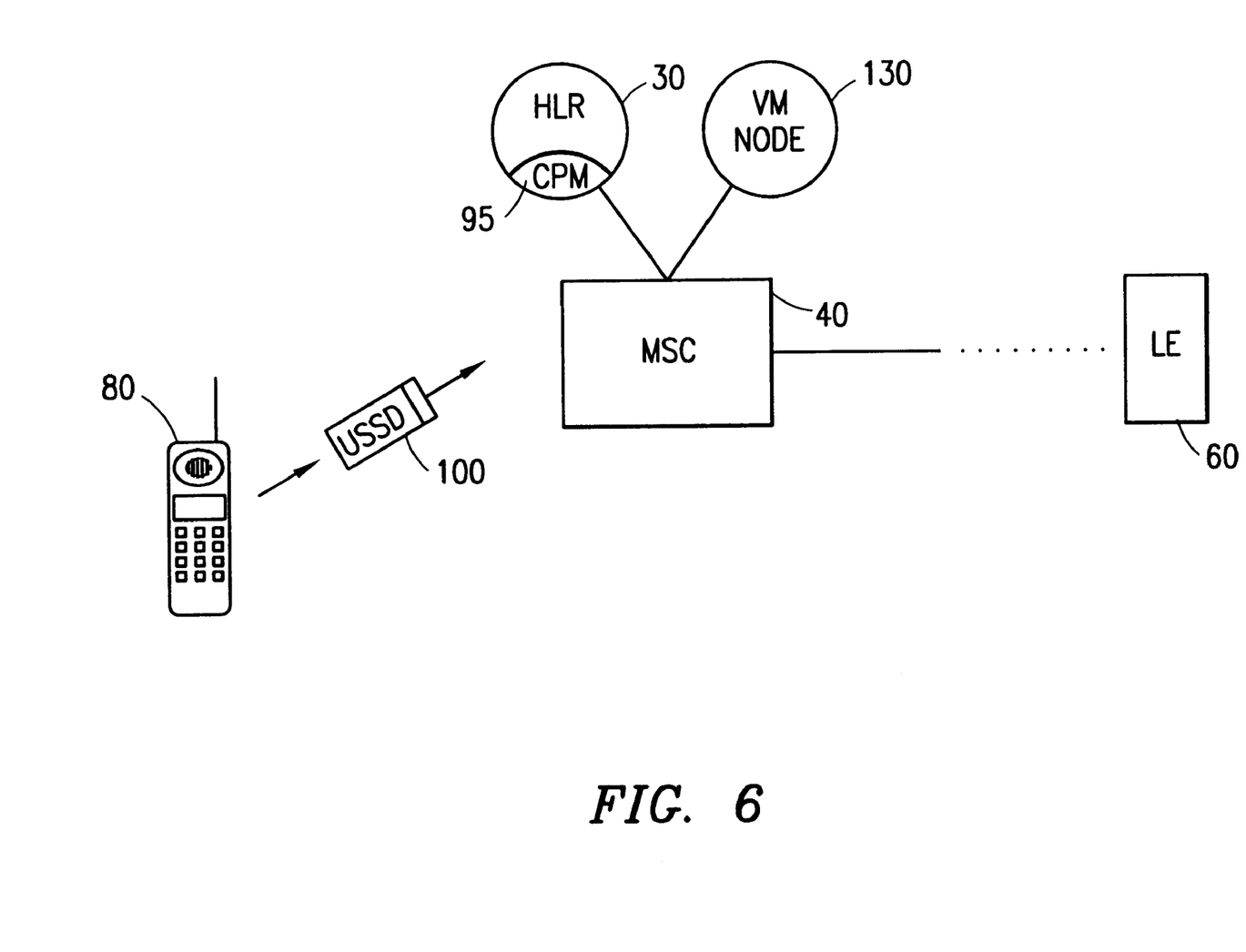
FIG. 6 is a block diagram of a PLMN illustrating an external node associated with a MSC for validating a forward-to-number.

Reference is now made to FIG. 6 where a block diagram illustrating an external node validating a forward-to-number within a PLMN is shown. Due to functional requirements, such as system capacity or requirements, the validation module may exists as an external node 130 attached to the MSC 40. Whenever the mobile station 80 transmits a USSD message 100 encapsulated with a request to activate a call forwarding subscriber feature, an USSD handler within the MSC 40 receives the transmitted message and appropriately forwards it to the external node 130. The external node 130, after confirming the appropriate subscriber category with the HLR 30, directs the serving MSC 40 either to establish a speech connection between the mobile station 80 and the forward-to-number as described in FIG. 4, or communicate TCAP messages to verify the validity of the forward-to-number with the local exchange 60 as described in FIG. 5. After the forward-to-number has been verified, the external node 130 invokes the CFV activation program module (CPM) 95 to alter the state of the CFV subscriber feature.

Although a preferred embodiment of the method and apparatus of the present invention has been illustrated in the accompanying Drawings and described in the foregoing Detailed Description, it will be understood that the invention is not limited to the embodiment disclosed, but is capable of numerous rearrangements, modifications and substitutions without departing from the spirit of the invention as set forth and defined by the following claims.

What is claimed is:

1. A method for validating a directory number for a call forwarding feature within a telecommunications system, said method comprising the steps of:
   receiving a request to activate said call forwarding feature from a mobile station;
   receiving said directory number from said mobile station over a connection-less communications link; and
   validating said directory number by communicating between a mobile switching center (MSC) associated with said mobile station and a local exchange serving said directory number;
   wherein said step of validating comprises the step of said MSC automatically initiating said communicating following receipt of said directory number and said validating step validates said directory number prior to activation of the call forwarding feature by said telecommunications system;
   wherein said step of validating further comprises the step of automatically transmitting an application layer connection-less signal encapsulating said directory number from said MSC to said local exchange to request said local exchange to verify the validity of said directory number.

2. The method of claim 1 wherein said step of receiving said directory number further comprises the step of receiving said directory number by a Direct Transfer Application Protocol (DTAP) based message transmitted by said mobile station over said connection-less communications link.

3. The method of claim 1 wherein said step of receiving said directory number further comprises the step of receiving said directory number by an Unstructured Supplementary Service Data (USSD) message transmitted by said mobile station over said connection-less communications link.

4. The method of claim 1 wherein said application layer connection-less signal comprises a Transaction Capability Application Part (TCAP) message.

5. The method of claim 1, wherein:
   said step of validating further includes the step of receiving a verification response from said local exchange.

6. A system for validating a directory number for a call forwarding feature within a telecommunications system, said system comprising:
   means for receiving a request to activate said call forwarding feature from a mobile station;
   means for receiving said directory number from said mobile station over a connection-less communications link; and
   means for validating said directory number by communicating between a mobile switching center (MSC) associated with said mobile station and a local exchange serving said directory number, said communicating being automatically initiated by said MSC following receipt of said directory number from said mobile station and prior to the call forwarding feature being activated by said telecommunications system;
   wherein said means of validating further comprises a means for automatically transmitting an application layer connection-less signal encapsulating said directory number from said MSC to said local exchange to request said local exchange to verify the validity of said directory number.

7. The system of claim 6 wherein said means for receiving said directory number further comprises means for receiving said directory number by a Direct Transfer Application Protocol (DTAP) based message transmitted by said mobile station over said connection-less communications link.

8. The system of claim 6 wherein said means for receiving said directory number further comprises means for receiving said directory number by an Unstructured Supplementary Service Data (USSD) message transmitted by said mobile station over said connection-less communications link.

9. The system of claim 7 wherein said application layer connection-less data signal comprises a Transaction Capability Application Part (TCAP) message.

10. The system of claim 6, wherein:
    said means for validating further includes a means for receiving an application layer connection-less data signal from said local exchange containing verification data for said directory number.

11. A system for validating a forward-to-number from a mobile station, said mobile station served by a mobile telecommunications network, said system comprising:

a connection-less communications link for transporting a forward-to-number from said mobile station to said mobile telecommunications network; and a validation module for validating said forward-to-number by automatically communicating said forward-to-number with a local exchange serving a telephone terminal associated with said forward-to-number;

wherein said validation module comprises means for automatically establishing a speech connection between said mobile station and said telephone terminal to enable verbal verification.

12. The system of claim 11 wherein said connection-less communications link comprises a Direct Transfer Application Protocol (DTAP) based message.

13. The system of claim 11 wherein said connection-less communications link comprises an Unstructured Supplementary Service Data (USSD) message.

14. The system of claim 11 wherein said means for establishing said speech connection comprises:

means for automatically establishing a first speech connection from said mobile telecommunications network to said mobile station;

means for automatically establishing a second speech connection from said mobile telecommunications network to said telephone terminal; and means for automatically connecting said first speech connection with said second speech connection.

15. The system of claim 11 wherein said validation module comprises an external node connected to a Mobile Switching Center within said mobile telecommunications network.

16. The system of claim 11 wherein said application layer connection-less signal comprises a Transaction Capability Application Part (TCAP) signal.

17. A method for validating a forward-to-number for a call forwarding feature, said method comprising the steps of:

transmitting a forward-to-number from said mobile station to a mobile telecommunications network serving said mobile station via a connection-less signal;

establishing a first speech connection from a mobile switching center within said mobile telecommunications network to said mobile station automatically following said transmitting step;

automatically establishing a second speech connection from said mobile switching center within said mobile telecommunications network to the telephone terminal associated with said forward-to-number; and connecting said first speech connection with said second speech connection.

18. The method of claim 17 further comprising the step of activating said call forwarding feature after the connection of said first and second speech connection.

19. The method of claim 17 wherein said step of transmitting said forward-to-number further comprises the step of transmitting said forward-to-number using an Unstructured Supplementary Service Data (USSD) message.

20. The method of claim 17 wherein said step of transmitting said forward-to-number further comprises the step of transmitting said forward-to-number using a Direct Transfer Application Protocol (DTAP) based message.

21. The method of claim 17 wherein said step of establishing said first speech connection further comprises the step of initiating a call back toward said mobile station.

22. A method for validating a forward-to-number for a call forwarding feature, said method comprising the steps of:

transmitting a forward-to-number from a mobile station to a mobile telecommunications network serving said mobile station via a connection-less signal;

transmitting an application-layer connection-less signal encapsulating said forward-to-number requesting verification to a local exchange serving said forward-to-number; and receiving a result of said verification from said local exchange.

23. The method of claim 22 further comprising the step of activating a call forwarding feature for said mobile station in response to said verification.

24. The method of claim 22 wherein said step of transmitting said forward-to-number further comprises the step of transmitting said forward-to-number using an Unstructured Supplementary Service Data (USSD) message.

25. The method of claim 22 wherein said step of transmitting said forward-to-number further comprises the step of transmitting said forward-to-number using a Direct Transfer Application Protocol (DTAP) based message.

26. The method of claim 22 wherein said application layer connection-less signal comprises a Transaction Capability Application Part (TCAP) signal.

* * * * *